(12) United States Patent
Johnston et al.

(10) Patent No.: US 7,017,119 B1
(45) Date of Patent: Mar. 21, 2006

(54) SYSTEM AND METHOD FOR DISPLAY NOTIFICATION IN A TABBED WINDOW SETTING

(75) Inventors: Bruce Johnston, Arlington, MA (US); Ryan Miller, Boston, MA (US)

(73) Assignee: Vaultus Mobile Technologies, Inc., Boston, MA (US)

( * ) Notice: Subject to any disclaimer, the term of this patent is extended or adjusted under 35 U.S.C. 154(b) by 462 days.

(21) Appl. No.: 10/098,866

(22) Filed: Mar. 14, 2002

Related U.S. Application Data

(60) Provisional application No. 60/275,916, filed on Mar. 15, 2001.

(51) Int. Cl.
*G06F 3/00* (2006.01)

(52) U.S. Cl. ............ 715/777; 715/772; 715/774; 715/786

(58) Field of Classification Search .......... 715/777, 715/772, 774, 779, 859, 861, 864, 776, 786, 715/830, 783, 973
See application file for complete search history.

(56) References Cited

U.S. PATENT DOCUMENTS

| | | | |
|---|---|---|---|
| 5,542,040 A * | 7/1996 | Chang et al. | 715/776 |
| 5,898,432 A * | 4/1999 | Pinard | 715/861 |
| 6,108,003 A * | 8/2000 | Hall et al. | 715/772 |
| 6,518,983 B1 * | 2/2003 | Grohmann et al. | 715/781 |
| 2002/0122050 A1 * | 9/2002 | Sandberg | 345/705 |
| 2003/0069874 A1 * | 4/2003 | Hertzog et al. | 707/1 |
| 2003/0071848 A1 * | 4/2003 | Carroll | 345/776 |

\* cited by examiner

*Primary Examiner*—Ba Huynh
(74) *Attorney, Agent, or Firm*—Jones Day

(57) ABSTRACT

A system and method are disclosed for informing users that data associated with one or more concurrently-running components has changed. In a preferred embodiment, the system and method comprise a GUI that includes a plurality of tabs associated with independently selectable components. When data associated with a particular component changes, the component's tab is made to flash. The flashing continues until the user selects the component. In a second preferred embodiment, when the tab associated with the component whose data has changed is not currently displayed, a different GUI element is made to flash until the tab is displayed.

5 Claims, 5 Drawing Sheets

SYSTEM AND METHOD FOR DISPLAY NOTIFICATION IN A TABBED WINDOW SETTING

This application claims priority from U.S. provisional patent application Ser. No. 60/275,916, filed Mar. 15, 2001, entitled System and Method for Display Notification in a Tabbed Window Setting, which is hereby incorporated by reference.

BACKGROUND OF THE INVENTION

Tabbed components are a common graphical user interface (GUI) metaphor in which graphical "tabs" are used to identify independent components of a single application running concurrently on a user device. For example, a single application may include a first component for accessing e-mail and a second component that maintains a calendar, each identified by a graphical tab displayed on the device's display screen.

When a user wishes to select a particular component, he or she chooses the tab associated with the component, typically by clicking on it with a mouse. This causes the component to run in the foreground and its GUI to be displayed on the device's display screen.

The tab of the currently-selected component is typically modified in some way (e.g., change of color) to identify the current selection to the user. The tabs may reside either above, below, to the left, or to the right of the selected component's GUI. A typical example of a GUI comprising tabbed components is shown in FIG. 1.

The tabbed-component metaphor is a powerful one because it communicates to users that a large number of independent components are available for selection in a manner that does not take up a large amount of screen space. It also provides users with easy navigation between components.

Although tabbed components as presently designed are quite useful, they suffer from a significant drawback that makes them less than satisfactory in certain cases. In particular, when data associated with one or more of the independent components is subject to change without user intervention, the user has no way of knowing that the information has changed, unless the user by chance selects the component. If the user is currently viewing a different component, a significant amount of time may pass before he or she thinks to check the status of other components and is made aware of the changes. Moreover, the user must currently navigate through each tabbed component one by one and view the component's GUI to determine whether any data associated with the component has changed.

SUMMARY OF THE INVENTION

A system and method are disclosed for informing users that data associated with one or more concurrently-running components has changed. In a preferred embodiment, the system and method comprise a GUI that includes a plurality of tabs associated with independently selectable components. When data associated with a particular component changes, the component's tab is made to flash. The flashing continues until the user selects the component. In a second preferred embodiment, when the tab associated with the component whose data has changed is not currently displayed, a different GUI element is made to flash until the tab is displayed.

BRIEF DESCRIPTION OF THE DRAWINGS

The above summary of the invention will be better understood when taken in conjunction with the following detailed description and accompanying drawings, in which.

DETAILED DESCRIPTION OF THE PREFERRED EMBODIMENTS

Figure 1:
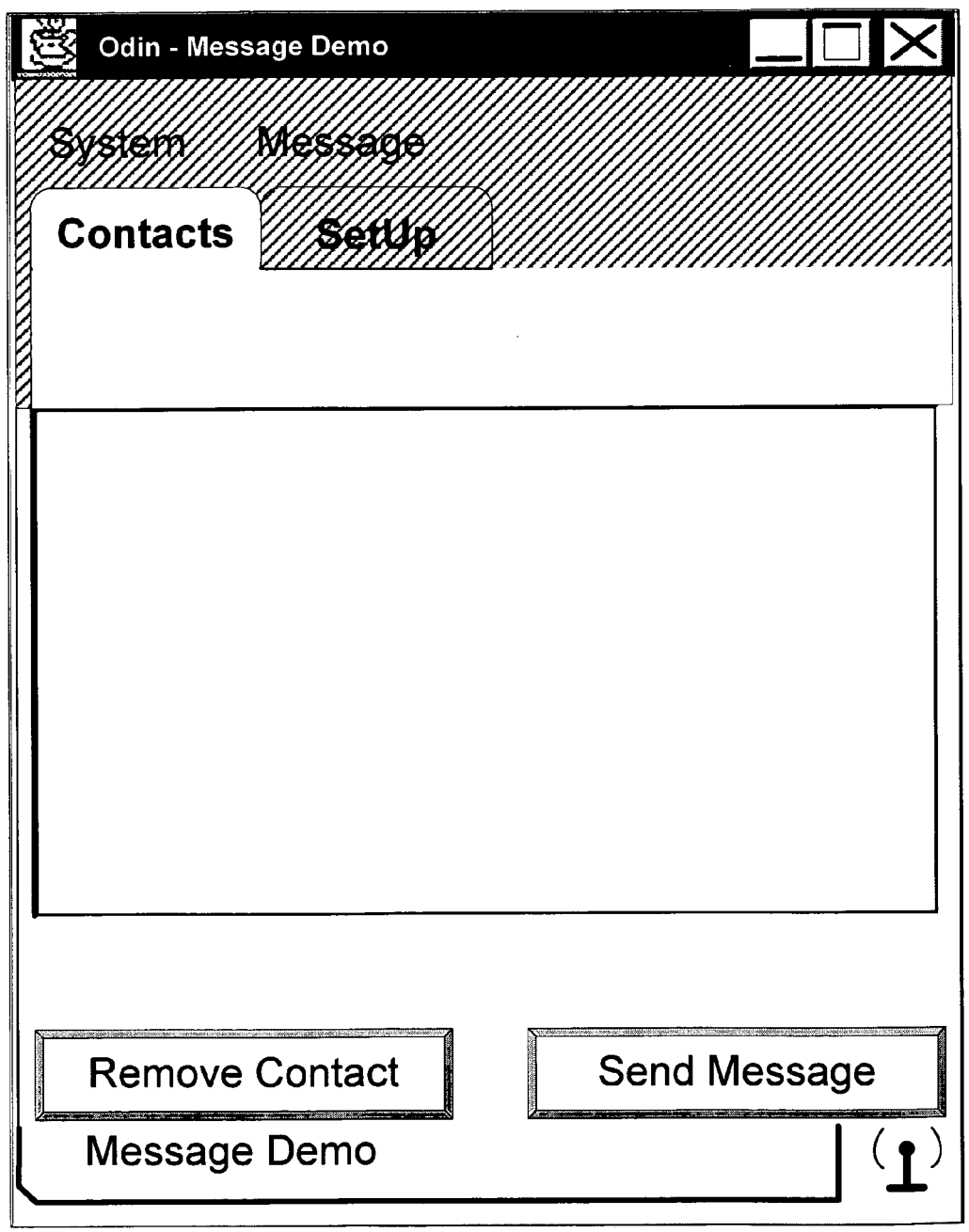
FIG. 1 illustrates a graphical user interface comprising tabbed components.
Figures 2A, 2B:
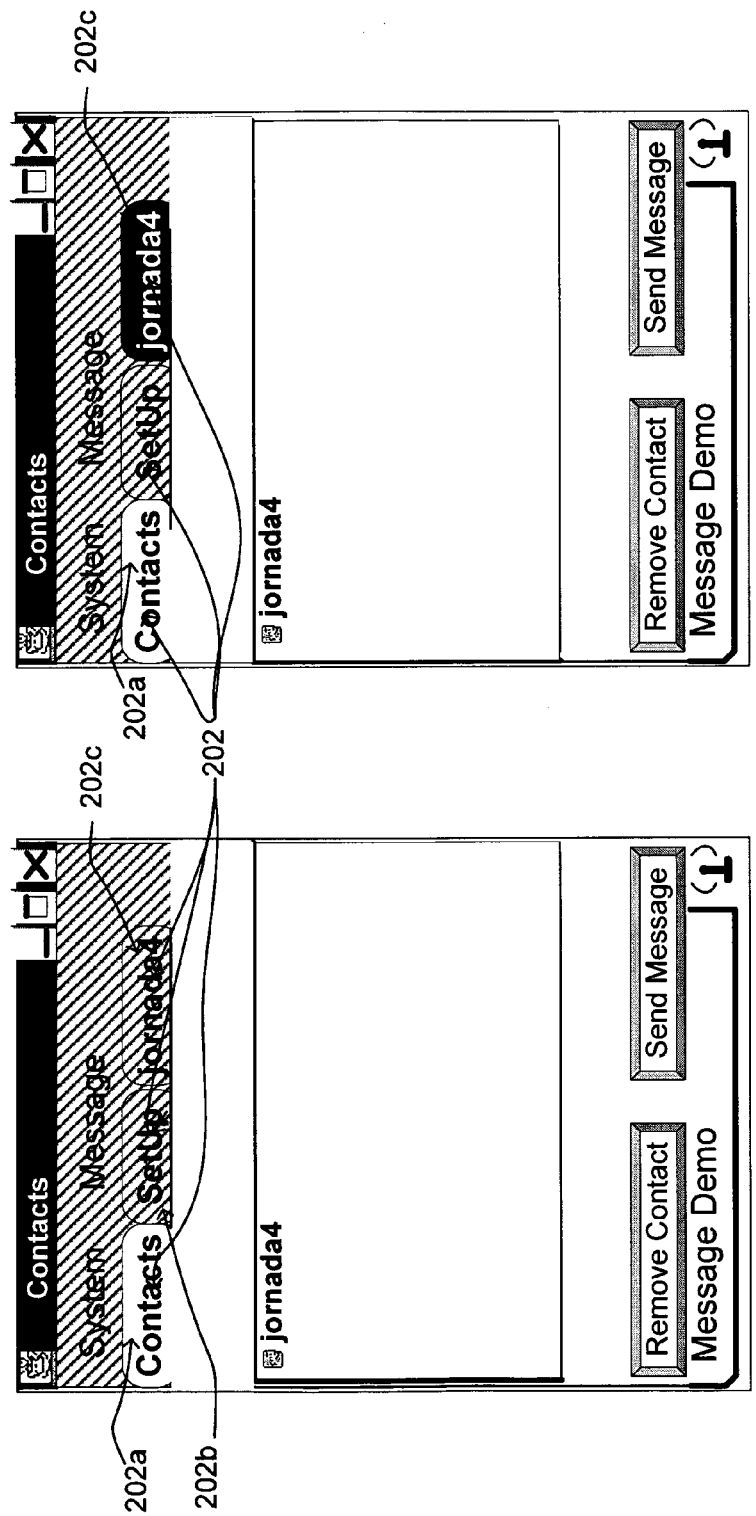
FIGS. 2A–B illustrate a graphical user interface in which a tab associated with a component whose data has changed is caused to flash.

FIGS. 2A–B illustrate a first preferred embodiment of the present invention. As shown in FIG. 2A, the GUI displayed to the user preferably comprises a plurality of tabs 202, each associated with an independent component of a single application that may be individually selected by the user. The tab associated with the currently selected component (in this case tab 202a) is typically distinguished from the other tabs by displaying the tab in a different color, as shown in the figure. A GUI 204 associated with the selected component fills much of the remainder of the device's display screen.

Figure 3:
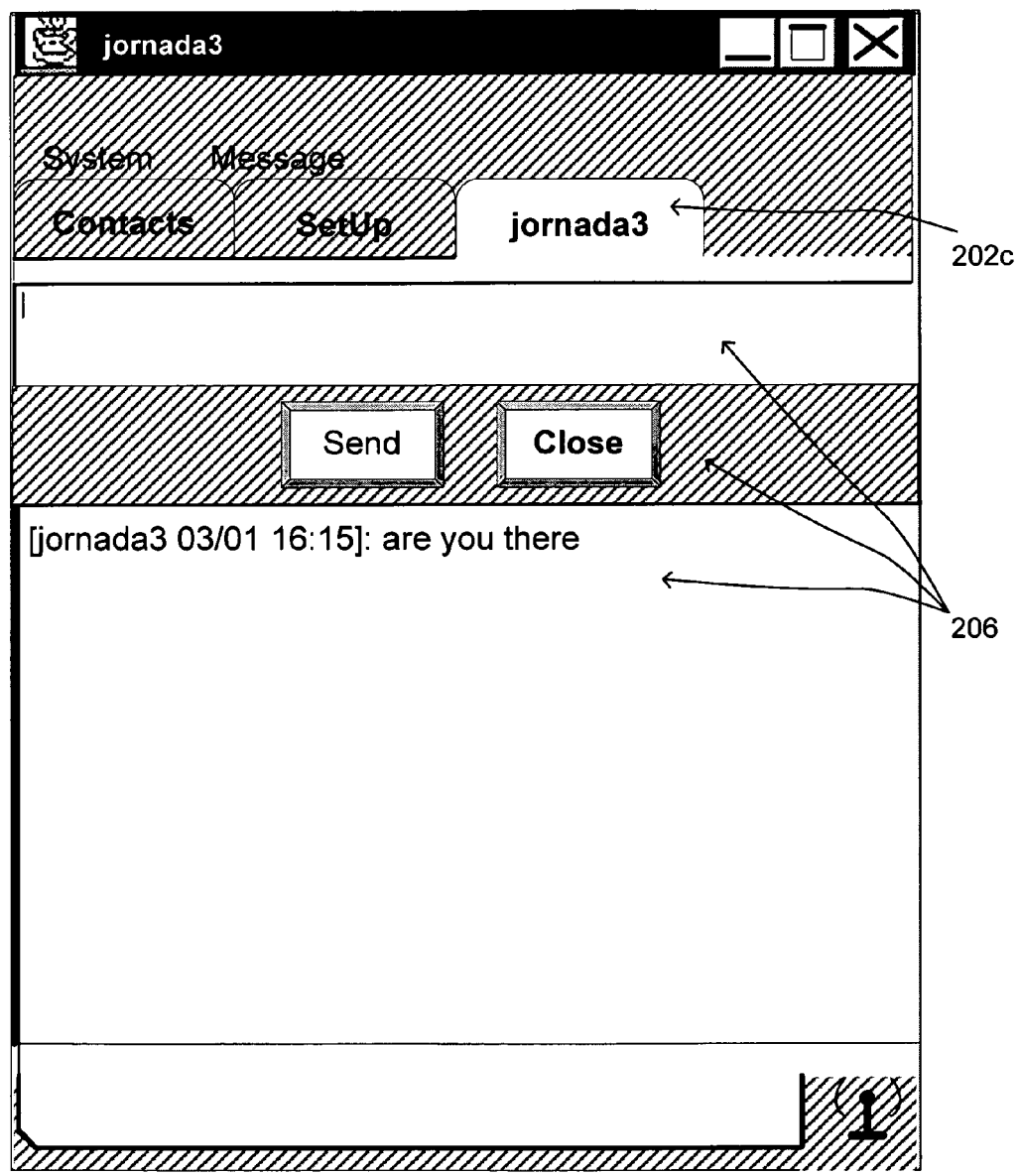
FIG. 3 illustrates the graphical user interface of FIGS. 2A–B once the user selects the component associated with the flashing tab.

In a preferred embodiment, when data associated with an unselected component changes, the component's tab is modified in some way, such as by being made to flash. For example, if data associated with a component named "jornada3" changes, the background of tab 202c may be caused to alternate between its usual color, as shown in FIG. 2A, and a second color, as shown in FIG. 2B. Once the user selects tab 202c, the jornada component becomes active, its GUI 206 is displayed on the device's display screen, and tab 202c ceases flashing, as shown in FIG. 3.

The first preferred embodiment described above provides a mechanism for informing the user that data associated with a particular unselected component has changed when the component's tab is displayed on an electronic device's display screen. In many cases, however, the total number of tabs is greater than can be displayed along a single horizontal row on the device's display screen. As a result, the tabs are often placed in a scrollable region of the GUI so that the user can scroll across the horizontal row of tabs and see each one. This is especially true on handheld devices where the small screen size necessarily 15' limits the number of tabs that can fit along a single horizontal row and often makes it impractical to provide a second row of tabs. One such example of scrolling tabs is demonstrated in FIGS. 4A–B.

Figure 4A:
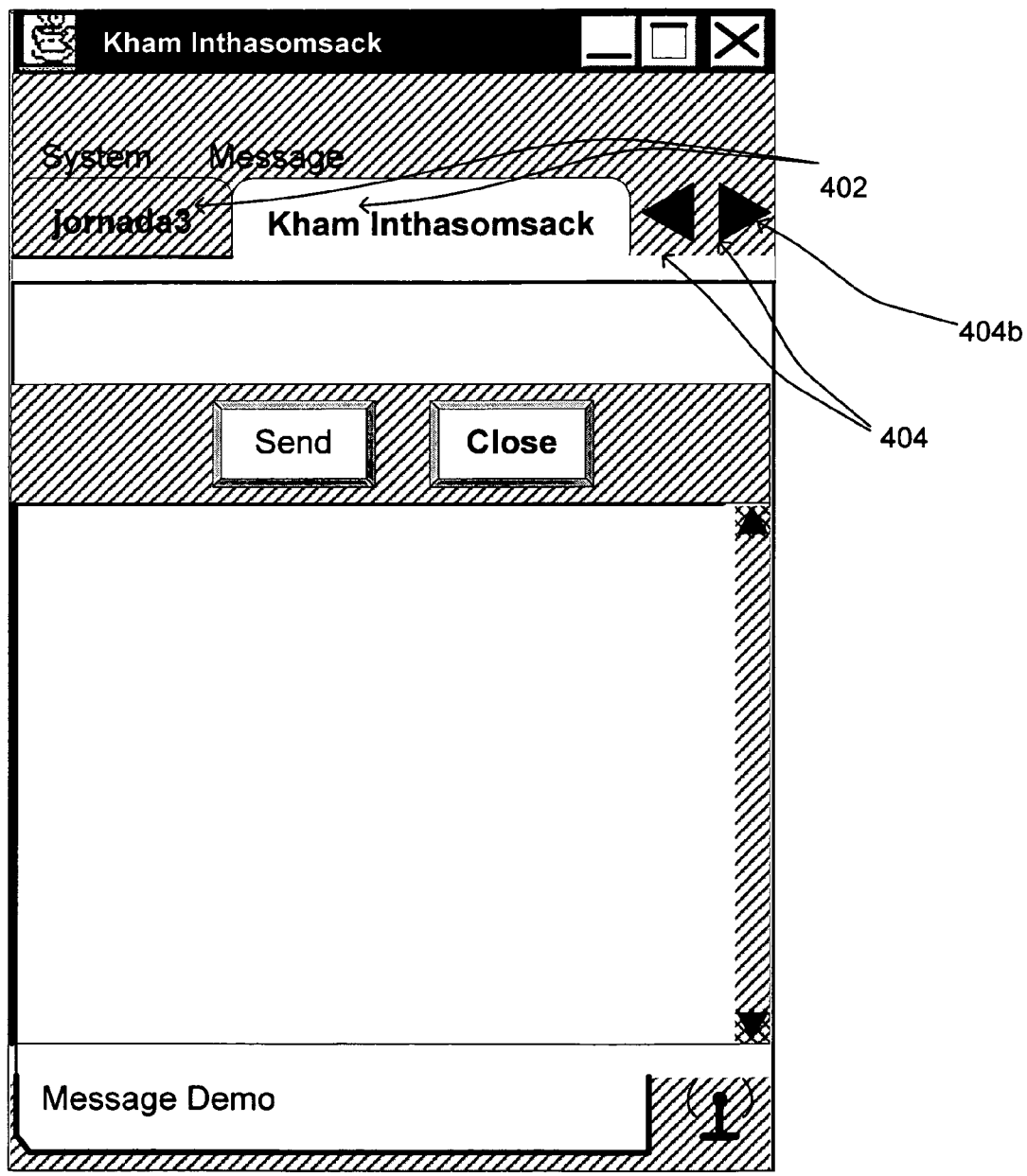
FIGS. 4A–B illustrate a graphical user interface comprising a scrollable row of tabs.
Figure 4B:
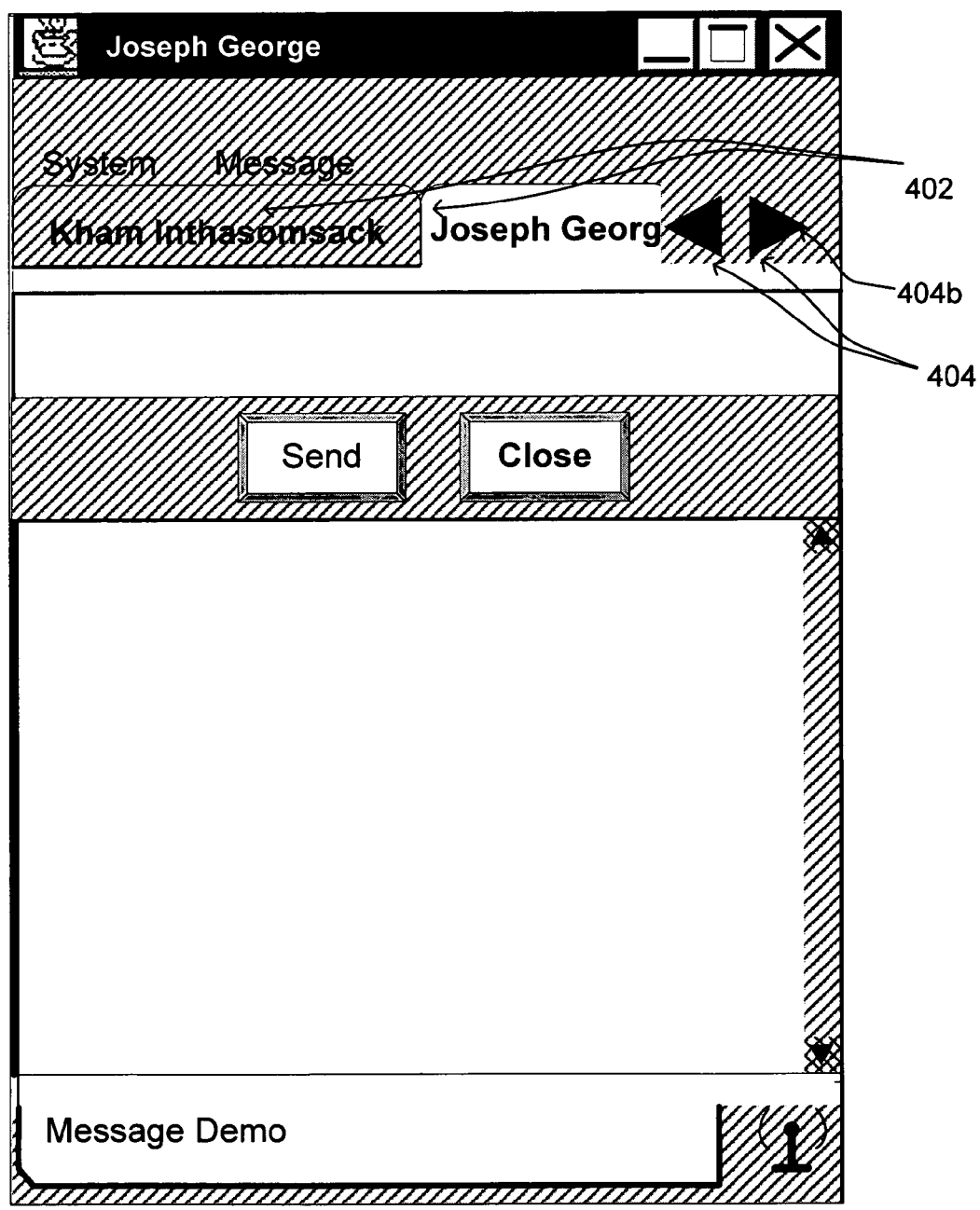

As shown in FIGS. 4A–B, when the number of tabs 402 is greater than can be displayed in a single horizontal row, the GUI is typically provided with arrow keys 404 that permit the user to scroll along the row of tabs and sequentially view them. Thus, for example, by clicking on the right arrow key 404b, the user may cause the GUI to scroll from FIG. 4A, where the jornada3 and Kham Inthasomasack tabs are visible, to FIG. 4B, where the Kham Inthasomasack and most of the Joseph George tabs are visible.

As will be recognized, when scrolling tabs are employed, the first preferred embodiment described above does not completely solve the problem of informing the user of changes to data associated with unselected components. In particular, when changes are made to data associated with a component whose tab is not currently on the screen, the user may not realize that such changes have occurred.

Accordingly, in a second preferred embodiment, when changes have occurred to data associated with a component whose tab is not currently on the screen, the display of a different GUI element is modified to indicate this fact to the user. For example, in a preferred embodiment, the arrow key 404 that points in the direction of the tab associated with the component whose data has changed, is modified in some way, such as by flashing. The arrow preferably continues to flash until the user scrolls along the row of tabs and the tab associated with the component whose data has changed enters the display screen. At that point, the tab begins to flash and arrow 404 ceases flashing.

If more than one component includes data that has changed, arrow 404 preferably continues flashing until there are no other invisible tabs along the row in the arrow's direction whose components include data that has changed.

In a preferred embodiment, arrows 404 only flash if an invisible tab along the row in the arrow's direction that would be made to flash if displayed, has not yet been viewed by the user. In other words, if a tab was visible and flashing, and was then scrolled off the viewable area by the user, the arrow that would let the user navigate back to that tab is preferably not made to flash, unless the arrow should be made to flash because of another invisible tab along the same direction that the user has not yet seen flashing.

In an alternative preferred embodiment, when data associated with an unselected component changes, the user may be notified by alternative means other than, or in addition to, the flashing GUI elements described above. For example, an audible tone or other sound emitted by the user device may be used to convey to the user that data associated with an unselected application has changed. Alternatively, vibration of the user device may be used to inform the user of such data changes. As noted, such alternative means may be used either individually or in combination with the flashing GUI elements described above.

While the invention has been described in conjunction with specific embodiments, it is evident that numerous alternatives, modifications, and variations will be apparent to those skilled in the art in light of the foregoing description.

The invention claimed is:

1. A method of informing a user that data associated with one or more unselected components of a single application has changed, comprising:

providing a plurality of tabs, each tab associated with an independent component running on an electronic device, each independent component having data associated therewith;

receiving a signal representative of a selection of a first component from the plurality of independent components;

in response to the signal, displaying a GUI associated with the selected component on a display screen of the electronic device;

detecting that data associated with an unselected component has changed;

in response to the step of detecting, modifying the display of the tab associated with the unselected component whose data has changed;

detecting that the tab associated with the unselected component whose data has changed is not currently displayed on the electronic device's display screen; and in response to the second detecting step, modifying the display of another element displayed on the electronic device's display screen wherein the another element comprises an arrow.

2. The method of claim 1, wherein the display of the tab associated with the unselected component whose data has changed is modified by causing the tab to flash.

3. The method of claim 2, wherein the tab continues to flash until the user selects the unselected component whose data has changed.

4. The method of claim 1, wherein the arrow continues to flash until the tab associated with the unselected component whose data has changed is displayed on the electronic device's display screen.

5. The method of claim 4, wherein the arrow does not resume flashing when the tab associated with the unselected component whose data has changed ceases to be displayed on the electronic device's display screen.

* * * * *